United States Patent [19]

Bohlin

[11] 4,364,406

[45] Dec. 21, 1982

[54] METHOD AND DEVICE FOR ESTABLISHING A FLOW CONNECTION WITH A PIPE

[76] Inventor: Jan O. Bohlin, Hamnviksvägen 55, Nynäshamn, Sweden, S-149 00

[21] Appl. No.: 151,725

[22] Filed: May 20, 1980

[30] Foreign Application Priority Data

May 22, 1979 [SE] Sweden ............................... 7904505

[51] Int. Cl.³ ...................... F16L 55/07; F16K 43/00; B23P 15/00
[52] U.S. Cl. .................................... 137/15; 137/318; 29/157.1 R; 72/325
[58] Field of Search .......................... 29/157.1, 157 T; 137/318, 317, 375, 15; 251/146, 145; 72/325

[56] References Cited

U.S. PATENT DOCUMENTS

| | | | |
|---|---|---|---|
| 2,660,192 | 11/1953 | Hunter | 137/318 |
| 2,736,335 | 2/1956 | Webber | 137/318 |
| 3,302,493 | 2/1967 | Hulslander et al. | 137/318 |
| 3,580,269 | 5/1971 | Ehrens | 137/318 |
| 3,687,166 | 8/1972 | Herrin | 137/318 |
| 3,762,263 | 10/1973 | Bocceda | 137/318 |
| 3,973,584 | 8/1976 | McKinnon et al. | 137/318 |
| 4,204,559 | 5/1980 | Wagner | 137/318 |
| 4,270,559 | 6/1981 | Wallberg | 29/157.1 R |

Primary Examiner—Daniel C. Crane
Attorney, Agent, or Firm—Holman & Stern

[57] ABSTRACT

A method to establish flow communication with a tubular pipe (3), and a device for utilization of the method, whereby two housing members (6, 7) are joined in a sealing contact position embracing the tubular pipe (3), whereafter a piston member (1), movably arranged in one housing member (6), having a towards the center of the pipe (3) directed chisel-shaped part (2) extending in a parallel relationship to the length axis of the tubular pipe (3), is brought to move towards the pipe (3) by application of a force and to penetrate through its wall, thereby creating a through slot extending in longitudinal direction of the pipe (3), the edge portions of said slot extending in longitudinal direction of the pipe (3) and being bent into a position directed towards the inside surface of the pipe (3), an adjustment member (5) also being arranged, whereby the piston member (1) can be moved in direction to and from the slot taken up in the pipe (3), thereby faciliating desired adjustment of the flow communicating area with the pipe (3), a channel (9) being arranged in the housing member (6) adjacent to the movable piston member (1), arranged to faciliate flow communication with said pipe (3) from existing opening in the slot taken up in the pipe (3).

12 Claims, 3 Drawing Figures

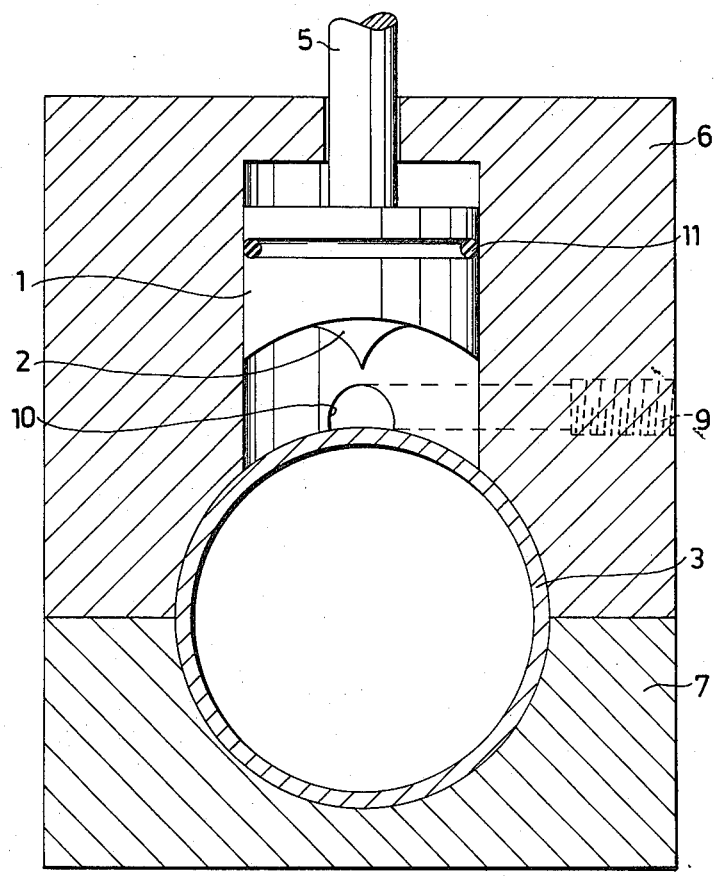

METHOD AND DEVICE FOR ESTABLISHING A FLOW CONNECTION WITH A PIPE

BACKGROUND OF THE INVENTION

There is a frequent need for establishing connections with tubular pipes within various technical fields, including tubular pipes intended for transport of gaseous as well as liquid media. Flow communication with a tubular pipe is usually achieved by replacing a short part of the pipe with e.g. a T-coupling, whereby it is possible to establish flow communication with, for example, another pipe. In certain cases, the coupling can be combined with a valve member, whereby the flow communication becomes adjustable. A disadvantage with this type of couplings is, that a part of the main pipe must be replaced with a coupling, e.g. a T-coupling, which means that the pipe can not be used for transport of a gaseous or liquid medium when the connection is made.

In order to overcome the above disadvantage, a type of coupling has been proposed, including two housing members, which by means of screws can be attached embracing a tubular pipe with sealing contact against the outer peripheral surface of the pipe. A piston member, having a cutting edge portion, is arranged in one of said housing members together with an explosive charge, and the charge can be initiated by e.g. a hammer blow directed towards an initiating member protruding from the housing member, whereby the piston member is moved in direction towards the embraced tubular pipe and partly past same, thereby removing a wall portion from the pipe. After completed movement, the piston member extends crosswisely in relation to the length axis of the pipe, having a portion of the outer surface extending into the pipe through the opening taken up by removal of a wall portion. Furthermore, the piston member is arranged with a channel extending crosswisely in relation to its length axis, and by rotating the piston member in relation to the opening taken up in the wall of the tubular pipe, an adjustable flow communication is achieved between the tubular pipe and a second pipe attached to the housing member, which second pipe communicates with the channel in the piston members by means of a channel arranged in the housing member.

However, this type of coupling has also a number of disadvantages, even though it must be regarded as a considerable step forward in relation to previously known techniques. For example, when large opening areas are required to facilitate large flow quantities from the pipe embraced by the coupling, the design is restricted by the fact that only a small wall portion can be removed, if the strength of the pipe should not be endangered. The aforementioned type of coupling is not suitable for large pipe diameters, since only a relatively small flow can be obtained from the relatively large flow capacity in the main pipe. An important disadvantage is also, that the piston member is arranged in a predetermined position in relation to the pipe embraced by the housing members, and that corrosion between the outer peripheral surface of the piston and adjacent cut surfaces in the pipe, which cut surfaces are formed in the previously described cutting operation, results in successively deteriorated sealing properties between the piston member and the cut surfaces, and in an earlier stage, the piston member can also, due to corrosion, be more or less restricted from a rotary movement in relation to the pipe. However, the difficulty to achieve efficient sealing properties between the piston member and adjacent cut surfaces is the major problem, which can cause undesired effects, namely a flow past the piston member to the crosswisely extending channel, which can prevent complete interruption of the flow to the connected pipe.

OBJECT OF THE INVENTION

The object of the present invention is to remove the problems related to a coupling of the type based on removal of a smaller wall portion at a tubular pipe by means of the above described operation, and a further object is to completely remove the problems created by the fact, that the length axis of the piston member is arranged in a predetermined crosswisely extending position in relation to the length axis of the tubular pipe, i.e. the problems caused by corrosion between the outer surface of the piston member and adjacent cut surfaces at the tubular pipe. A further object is to faciliate creation of large through-flow areas in the connection to a pipe, whereby connections with large flow capacity can be achieved. It should be emphasized, that the present invention also can be used for applications where large flow areas are not desired at the connection point, and that such application are also achieved without previously known problems, caused by corrosion between the outer surface of the piston member and adjacent cut surfaces at the tubular pipe.

The above mentioned objects are achieved by a new inventive concept in relation to previously known and above described type of coupling, which was based on the fact that the piston member is moved in a crosswisely extending direction to the length axis of the tubular pipe and with the piston member arranged located in relation to the tubular pipe in such a way, that only a small part of the end surface of the piston member takes up contact with the pipe when the piston member is moved, in order to remove a small wall portion from the pipe.

The present invention is based on a piston member having a cutting or splitting end surface, arranged to perform a movement in direction towards the centre of a tubular pipe to which flow communication should be established and during said movement, a groove is formed extending in the longitudinal direction of the pipe. By designing said piston member in a suitable way, which is more fully described below, the piston member can serve as a valve member which faciliates adjustability of the flow from the groove taken up in the longitudinal direction of the pipe. This method removes completely all the problems related to sealing properties, caused by previously mentioned corrosion. It should also be emphasized, that flow communication is established without removing any part of the pipe from same, which could be moved with a gaseous or liquid medium being transported in the pipe. It should also be mentioned, that the present invention obviously also faciliates establishment of flow communication with pipes having a gaseous or liquid medium under pressure, and that the physical properties of the tubular pipe are basically maintained.

DESCRIPTION OF THE PRESENT INVENTION

Two basic embodiments of couplings, intended to faciliate flow communication with a tubular pipe, are more fully described below with reference to accompanying drawings, in which:

FIG. 3 is a cross-sectional view of a modified embodiment, basically intended for applications in which large through-flow areas are not required.

Figures 1, 2:
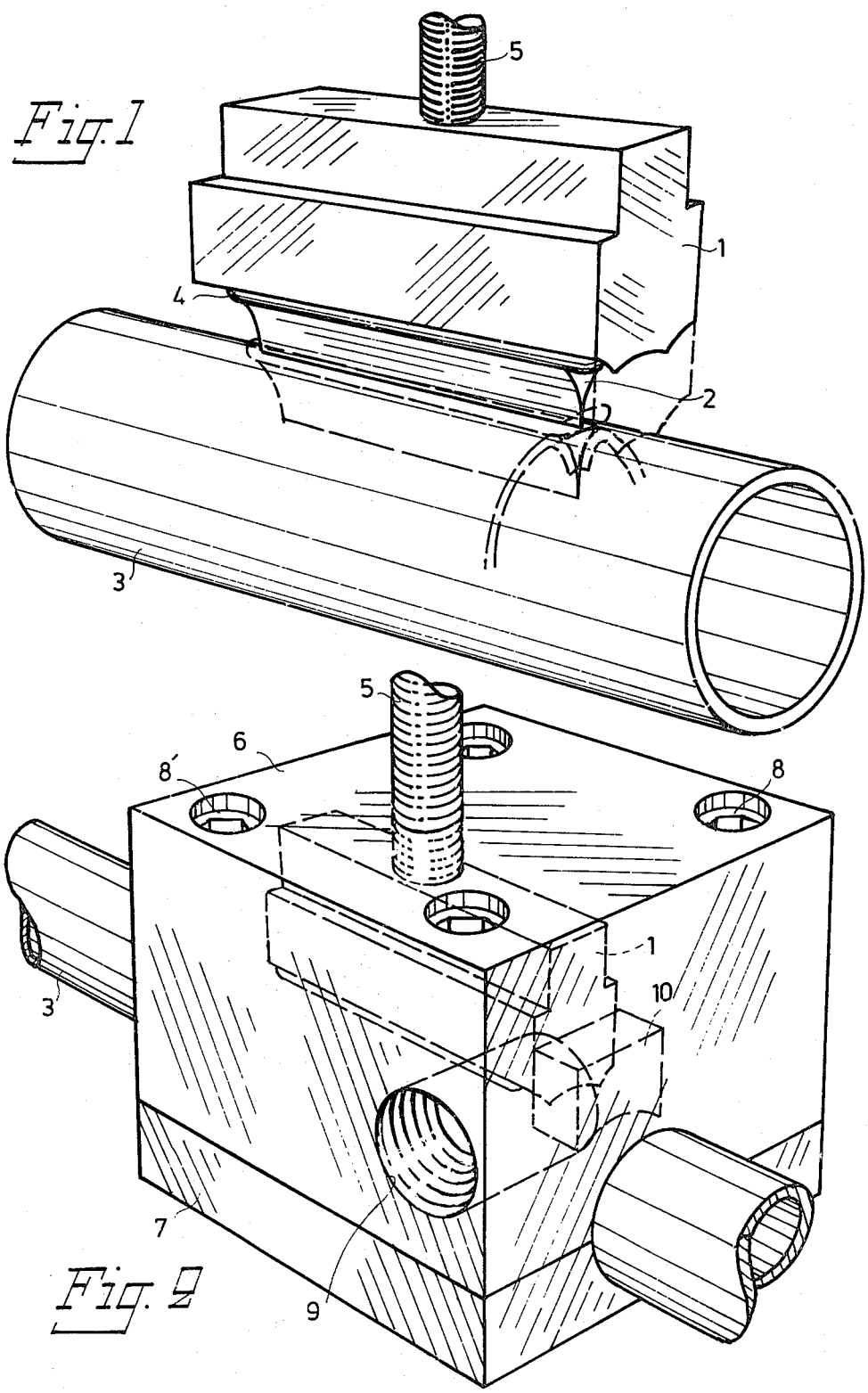
FIG. 1 is a perspective view, intended to show the basic principle of the method according to the present invention.
FIG. 2 is a perspective view, based on the principle shown in FIG. 1, but with a housing indicated.

As previously mentioned, the present invention is based on the fact that a piston member is moved towards the centre of a tubular pipe, and that the piston member during said movement forms a groove extending in longitudinal direction of the pipe. This basic principle is shown in FIG. 1 by means of a rectangular piston member 1, having a pointed or cutting portion 2 located immediately above a tubular pipe 3. As shown, the pointed cuttings portion 2 adjacent to the tubular pipe 3 is arranged with the cutting portion in a parallel relationship to the wall of the tubular pipe 3, and furthermore, the cutting portion 2 is shorter in longitudinal direction than the rectangular member 1 from which the cutting portion 2 extends, whereby a concave surface is formed at each side of the pointed portion 2, said concave parts preferably having a radius corresponding to, or exceeding, the outer radius of the tubular pipe 3. Furthermore, a gasket 4 is arranged surrounding the pointed portion 2, located at the portion of said member 2 directed from the tubular pipe 3. In order to secure the gasket 4 in said position, a groove can be arranged surrounding the pointed member 2. Finally, FIG. 1 indicates an adjustment stud 5, extending from the piston member 1 perpendicular to the axis of the tubular pipe 3. The adjustment stud 5 can either be non-rotatably attached to the piston member 1, or rotatably attached to the piston member 1, for example as shown arranged with an external screw thread, which thread, together with a co-operating internal thread in a member not shown, facilitates manual adjustment of the piston member 1 in direction to and from the tubular pipe 3.

From the position shown in FIG. 1, the piston member 1 with related parts performs a movement in direction towards the tubular pipe 3, when the piston member in a manner not shown is made subject to a force, e.g. by detonating an explosive charge behind same. When the force is applied, the pointed member 2 cuts through the wall of the tubular pipe, and takes up the position shown with broken lines in FIG. 1. As shown, the wall of the pipe is folded inwardly with two "lips" directed towards the centre of the tubular pipe 3, penetrated by the cutting member 2. Thus a slot extending in the longitudinal direction of the tubular pipe 3 is achieved, and intended flow communication is established.

By influencing the adjustment stud 5 with a suitable co-acting member, the penetrating depth of the pointed member 2 into the slot can be varied, whereby also adjustability of the outlet flow is achieved. When it is desired to completely interrupt the flow from the pipe through the slot, the piston member 1 is moved to a position in which the concave surfaces of the piston member 1 are located adjacent to the outer peripheral surface of the pipe 3, whereby the gasket 4 causes desired sealing properties, since the gasket 4 completely surrounds the slot taken up in the pipe 3, being compressed between the outer wall surface of the pipe 3 and the piston member 1. Leakage caused by corrosive damage is thus avoided, since not only the pointed member 2 acts as a sealing member. The reduction in flow area in the pipe 3 caused by folding the lip-shaped parts inwardly, and by the pointed member 2 extending into the pipe 3 when the piston member 1 has been arranged to interrupt a flow through the slot in the wall of the pipe 3, can be regarded as negligible and the reduction in area does not cause any noticeable disadvantages.

FIG. 2 shows an embodiment based on the principle described above with reference to FIG. 1. The coupling shown in FIG. 2 includes two housing members, 6 and 7 respectively which can be joined to each other by means of screws or bolts 8, 8'. The surfaces facing each other are arranged with semi-circular grooves, which grooves embrace a pipe 3 when the housing members 6, 7 are joined. In one of the housing members, a groove is arranged, in which a piston member 1, arranged as described with reference to FIG. 1, is movably arranged. A connecting channel 9, arranged with an internal screw thread, is also shown extending from an outer plane of the housing member 6, said channel 9 being arranged to communicate with a chamber 10, arranged adjacent to an end surface of the groove in which the piston member 1 is movably arranged, said chamber 10 being open in direction towards said groove and the semi-circular groove arranged in the housing member 6, which is arranged in contact with the outer peripheral surface of the pipe 3 in a sealing contact position. As described with reference to FIG. 1, the piston member 1 is also arranged connected with an adjustment stud 5, which extends out from the housing member 6.

When the housing members 6, 7 by means of screws or bolts 8, 8' have been attached to the pipe 3 at the point where a connection is desired, the piston member 1 is brought to move within the housing member 6 in direction towards the pipe 3. Said movement can be achieved by applying a mechanical, hydraulic or pneumatic force on the piston member 1 or the adjustment stud 5, but preferably by detonating a small explosive charge arranged to move the piston member 1 in direction towards the pipe 3 (not shown). Such an explosive charge can be initiated mechanically or electrically by means of a suitable initiating member, extending out from the housing member 6.

In the embodiment shown and described with reference to FIG. 2, the piston member 1 is arranged with a rectangular cross-section and the groove in the housing member 6, in which the piston member 1 is movably arranged, must also have a corresponding cross-sectional configuration. However, such a cross-sectional configuration can be regarded as less suitable from manufacturing point of view, but also other cross-sectional configurations can be used, as more fully described with reference to FIG. 3.

Furthermore, the channel 9 is shown communicating with a chamber 10, which chamber 10 is located adjacent to an end portion of the groove in which the piston member is movably arranged. It should be emphasized, that the channel 9 obviously also can be arranged to communicate with a groove for the piston member 1 at other points than as shown, e.g. at a point adjacent to a side surface of the groove for the piston member 1. However, the shown embodiment is advantageous, particularly if the chamber 10 is arranged with a suitable flow guiding shape, and if it is located after the piston member 1 in the flow direction for a medium transported in the pipe 3, since an advantageous flow characteristic can be achieved for the medium flowing from the pipe 3 to the channel 9.

As previously mentioned, the rectangular cross-sectional configuration of the piston member 1 can in certain cases be regarded as less advantageous, particularly with regard to the difficulties in manufacturing a suitable guiding groove in the housing member 6 for the piston member 1, in which groove the piston member can be moved. In order to overcome this manufacturing problem, the piston member 1 can be arranged in many other ways, one being shown in FIG. 3. According to this embodiment, one housing member 6 is arranged embracing a movably arranged piston member, having a circular cross-sectional configuration, the end portion directed towards the pipe 3 being arranged as a pointed or chisel shaped part 2. The groove, in which the piston member 1 is movably arranged, can thus be arranged having a circular cross-sectional configuration, which considerably simplifies the method of manufacture. A further advantage is, that the piston member 1, at the portion having a circular cross-sectional configuration, can be arranged with conventional surrounding sealing elements, in the shown embodiment by means of an O-ring 11. Obviously, the piston member 1 must be arranged guided in relation to the surrounding housing member 6, in order to maintain the pointed or chisel shaped part 2 extending in the longitudinal direction of the pipe 3. No such guiding members have been shown in FIG. 3, but guidance can be achieved in a number of ways, e.g. by a guiding pin arranged to co-act with a groove in the piston member 1 or a groove in the adjustment stud 5.

It should also be noted, that the modified embodiment described with reference to FIG. 1 primarily is intended to be used for applications in which small liquid or gas volumes should flow from the pipe 3, since a long slotted length makes it necessary to use a piston member 1 having a rectangular cross-sectional configuration. However, in connection with small pipe diameters and thus smaller gas or liquid volume flows from the pipe 3, the advantages with the described embodiment based on a mainly circular piston member 1 are obvious.

The described and shown embodiments only serve as basic examples of embodiments within the scope of the present invention, since many modifications can be performed, while maintaining the important and characteristic features of the invention.

I claim:

1. A method of establishing fluid communication between a fluid carrying member and at least one conduit comprising the steps of:
   (a) sealingly enclosing a section of said fluid carrying member within a housing comprised of at least two members sealingly secured to one another, one of said at least two housing members having a channel therein extending to an outer surface of said fluid carrying member and disposed perpendicular to the axis of said fluid carrying member, said channel being further provided with a means for communicating with said conduit in the vicinity of said fluid carrying member;
   (b) placing a piston within said channel, said piston having a lower portion which forms a longitudinally extending means for piercing a fluid carrying member arranged parallel to and disposed toward the axis of said fluid carrying member and providing said piston with a shoulder at its lower portion above said piercing means, said shoulder being configurationally commensurate with the surface of said fluid carrying member;
   (c) generating a means to rapidly propel said piston toward said fluid carrying member to cause said piercing means to penetrate said fluid carrying member and form an elongated slot with a pair of opposed parallel edge portions bent inwardly with said portions directed toward the center of said fluid carrying member and restricting further penetration of said fluid carrying member by contacting said shoulder against said fluid carrying member; and
   (d) arranging said piston in said slot to alter the rate of flow of fluid from said fluid carrying member into said conduit, providing said piston with a means to seal the elongated slot when said piston is arranged in the elongated slot so as to suspend fluid flow, which seal means is located adjacent said shoulder.

2. A method according to claim 1, wherein said means to rapidly propel said piston is actuated by mechanical, pneumatic or hydraulic force.

3. A method according to claim 1, wherein said means to rapidly propel said piston is actuated by an explosive force.

4. A method according to claim 1, wherein a chamber located adjacent to the sealingly enclosed section of the fluid carrying member an end portion of the piston which is located rearwardly in the flow direction serves as said communicating means for a media flow directed from the pipe which includes a minimum turbulence creative effect.

5. A device to establish fluid communication between a fluid carrying member and at least one conduit comprising:
   a housing comprised of at least two members sealingly joined to each other, said housing having a longitudinal aperture to sealingly receive and secure a section of fluid carrying member, said housing also having a channel disposed perpendicular to and communicating with said longitudinal aperture and at least one conduit communicating with said channel;
   means for sealingly joining each of said at least two housing members to each other;
   a piston movably positioned within said channel, said piston having at its lower end a longitudinally extending means for piercing a fluid carrying member arranged parallel to and disposed toward the longitudinal axis of said aperture, said piercing means comprising a chisel shaped blade having a straight cutting edge extending along a line parallel to the longitudinal aperture such that said piercing means is arranged to form an elongated slot and a pair of opposed parallel edge portions in said fluid carrying member bent inwardly with said portions directed toward the center of said fluid carrying member, said piston also provided with a shoulder configurationally commensurate with the surface of said fluid carrying member, which shoulder prevents further penetration of said fluid carrying member by said piercing means;
   a means adapted to form a seal between said piercing means and said fluid carrying member after it has been pierced, located adjacent said shoulder; and
   a means for adjusting the position of said piston within said channel.

6. A device according to claim 5, wherein said adjusting means is a threaded rod attached to an upper surface of said piston, said threaded rod projecting from said housing.

7. A device according to claim 5, wherein said device is provided with a means to rapidly propel said piston toward said longitudinal aperture.

8. A device according to claim 7, wherein said means to rapidly propel said piston is actuated by mechanical, pneumatic or hydraulic force.

9. A device according to claim 7, wherein said means to rapidly propel said piston is actuated by an explosive force.

10. A device according to claim 5, wherein said piston member is rectangular.

11. Device according to claim 5, wherein said longitudinal aperture is a cylinder and said longitudinally extending piercing means has the form of a chisel-shaped cutting edge, having a longitudinal length smaller than the longitudinal length of the upper portion of the piston and adjacent end surfaces which form said cutting edge are arranged concave with a radius not smaller than the outside radius of the cylinder.

12. Device according to claim 5, wherein said housing has provided therein a chamber arranged adjacent to an end portion of the piston which chamber serves as a means for fluid communication between said conduit and said channel.

* * * * *